United States Patent
Gendron-Bellemare et al.

(10) Patent No.: US 11,604,997 B2
(45) Date of Patent: Mar. 14, 2023

(54) TRAINING ACTION SELECTION NEURAL NETWORKS USING LEAVE-ONE-OUT-UPDATES

(71) Applicant: DeepMind Technologies Limited, London (GB)

(72) Inventors: Marc Gendron-Bellemare, London (GB); Mohammad Gheshlaghi Azar, London (GB); Audrunas Gruslys, London (GB); Remi Munos, London (GB)

(73) Assignee: DeepMind Technologies Limited, London (GB)

( * ) Notice: Subject to any disclaimer, the term of this patent is extended or adjusted under 35 U.S.C. 154(b) by 622 days.

(21) Appl. No.: 16/603,307

(22) PCT Filed: Jun. 11, 2018

(86) PCT No.: PCT/EP2018/065409
§ 371 (c)(1),
(2) Date: Oct. 7, 2019

(87) PCT Pub. No.: WO2018/224695
PCT Pub. Date: Dec. 13, 2018

(65) Prior Publication Data
US 2021/0110271 A1    Apr. 15, 2021

Related U.S. Application Data

(60) Provisional application No. 62/578,387, filed on Oct. 27, 2017, provisional application No. 62/517,826, filed on Jun. 9, 2017.

(51) Int. Cl.
*G06N 3/08*    (2006.01)
*G06N 3/04*    (2006.01)
*G06N 3/084*   (2023.01)

(52) U.S. Cl.
CPC .......... *G06N 3/084* (2013.01); *G06N 3/0454* (2013.01)

(58) Field of Classification Search
CPC ...... G06N 3/084; G06N 20/00; G06N 3/0454; G06N 7/005; G06N 3/006
See application file for complete search history.

(56) References Cited

U.S. PATENT DOCUMENTS 10,956,820 B2 *  3/2021  Mnih ................. G06N 3/084
2019/0236482 A1 *  8/2019  Desjardins ........... G06N 3/00
(Continued)

OTHER PUBLICATIONS

Office Action in European Appln. No. 18731064.4, dated Jun. 30, 2021, 9 pages.
(Continued)

*Primary Examiner* — Abderrahim Merouan
(74) *Attorney, Agent, or Firm* — Fish & Richardson P.C.

(57) ABSTRACT

Methods, systems, and apparatus, including computer programs encoded on a computer storage medium, for training a policy neural network. The policy neural network is used to select actions to be performed by an agent that interacts with an environment by receiving an observation characterizing a state of the environment and performing an action from a set of actions in response to the received observation. A trajectory is obtained from a replay memory, and a final update to current values of the policy network parameters is determined for each training observation in the trajectory. The final updates to the current values of the policy network parameters are determined from selected action updates and leave-one-out updates.

20 Claims, 6 Drawing Sheets

(56) References Cited

U.S. PATENT DOCUMENTS

2019/0258918 A1* 8/2019 Wang .................. G06N 3/0472
2020/0033869 A1* 1/2020 Palanisamy ............ G06N 3/006

OTHER PUBLICATIONS

Anschel et al., "Averaged-DQN: variance reduction and stabilization for deep reinforcement learning," Proceedings of the 34th International Conference on Machine Learning, Aug. 2017, 10 pages.
Bellemare et al., "A Distributional Perspective on Reinforcement Learning," https://arxiv.org/abs/1707.06887, Jul. 2017, 19 pages.
Bellemare et al., "The Arcade Learning Environment: An Evaluation Platform for General Agents," Journal of Artificial Intelligence Research, Jun. 2013, 47:253-279.
Fortunato et al., "Noisy Networks for Exploration," https://arxiv.org/abs/1706.10295vl, Jun. 2017, 17 pages.
Gu et al., "Q-Prop: Sample-Efficient Policy Gradient with an Off-Policy Critic," https://arxiv.org/abs/1611.02247v3, last revised Feb. 2017, 13 pages.
Harb et al., "Investigating Recurrence and Eligibility Traces in Deep Q-Networks," https://arxiv.org/abs/1704.05495, Apr. 2017, 8 pages.
He et al., "Learning to Play in a Day: Faster Deep Reinforcement Learning by Optimality Tightening," International Conference on Learning Representations, retrieved from URL <https://openreview.net/references/pdf?id=HlucB9s9g>, 2017, 13 pages.
Hessel et al., "Rainbow: Combining Improvements in Deep Reinforcement Learning," https://arxiv.org/abs/1710.02298, Oct. 2017, 14 pages.
Hochreiter et al., "Long Short-Term Memory," Neural Computation, Nov. 1997, 9(8):1735-1780.
Jaderberg et al., "Reinforcement Learning with Unsupervised Auxiliary Tasks," https://arxiv.org/abs/1611.05397, Nov. 2016, 14 pages.
Kingma et al., "Adam: A Method for Stochastic Optimization," https://arxiv.org/abs/1412.6980v1, Dec. 2014, 9 pages.
Krizhevsky et al., "ImageNet Classification with Deep Convolutional Neural Networks," Advances in Neural Information Processing Systems, 2012, 9 pages.
Li et al., "Toward Minimax Off-policy Value Estimation," Proceedings of the Eighteenth International Conference on Artificial Intelligence and Statistics (AISTATS), May 2015, 19 pages.
Lillicrap et al., "Continuous control with deep reinforcement learning," https://arxiv.org/abs/1509.02971v2, Nov. 2015, 14 pages.
Lin, "Self-Improving Reactive Agents Based on Reinforcement Learning, Planning and Teaching," Machine Learning, May 1992, 8:69-97.
Mitliagkas et al., "Asynchrony begets momentum, with an application to deep learning," 2016 54th Annual Allerton Conference on Communication, Control, and Computing (Allerton), Sep. 2016, 997-1004.
Mnih et al., "Asynchronous Methods for Deep Reinforcement Learning," Proceedings of the 33rd International Conference on Machine Learning, Jun. 2016, 10 pages.
Mnih et al., "Human-level control through deep reinforcement learning," Nature, Feb. 2015, 518:13 pages.
Moore et al., "Prioritized Sweeping Reinforcement Learning With Less Data and Less Time," Machine Learning, Oct. 1993, 13:103-130.
Morimura et al., "Nonparametric Return Distribution Approximation for Reinforcement Learning," Proceedings of the 27th International Conference on International Conference on Machine Learning, Jun. 2010, 8 pages.
Munos et al., "Safe and efficient off-policy reinforcement learning," https://arxiv.org/abs/1606.02647v2, Nov. 2016, 18 pages.
O'Donoghue et al., "Combining policy gradient and Q-learning," https://arxiv.org/abs/1611.01626v3, last revised Apr. 2017, 15 pages.
PCT International Preliminary Report on Patentability in International Appln. No. PCT/EP2018/065409, dated Dec. 10, 2019, 14 pages.
PCT International Search Report and Written Opinion in International Appln. No. PCT/EP2018/065409, dated Sep. 21, 2018, 20 pages.
Precup et al., "Eligibility Traces for Off-Policy Policy Evaluation," In Proceedings of the Seventeenth International Conference on Machine Learning, retrieved from URL <https://pdfs.semanticscholar.org/dfd9/30c63e31cd82b0b6dc015257d057e9e75810.pdf>, Jan. 2000, 8 pages.
Precup et al., "Off-Policy Temporal-Difference Learning with Function Approximation," Proceedings of the 18th International Conference on Machine Learning, Jun. 2001, 8 pages.
Riedmiller, "Neural Fitted Q Iteration—First Experiences with a Data Efficient Neural Reinforcement Learning Method," ECML 2005, Oct. 2015, 3720:317-328.
Schaul et al., "Prioritized Experience Replay," https://arxiv.org/abs/1511.05952v2, Nov. 2015, 23 pages.
Schaul et al., "Prioritized Experience Replay," https://arxiv.org/abs/1511.05952v4, last revised Feb. 2016, 21 pages.
Schulman et al., "Proximal Policy Optimization Algorithms," ahttps://arxiv.org/abs/1707.06347v2, last revised Aug. 2017, 12 pages.
Schulman et al., "Trost Region Policy Optimization," Proceedings of the 32nd International Conference on Machine Learning (ICML-15), Jun. 2015, 9 pages.
Shang et al., "Understanding and Improving Convolutional Neural Networks via Concatenated Rectified Linear Units," Proceedings of the 33rd International Conference on Machine Learning, 2016, 9 pages.
Silver et al., "Mastering the game of Go with deep neural networks and tree search," Nature, Jan. 2016, 529:20 pages.
Silver et al., "Mastering the game of Go without human knowledge," Nature, Oct. 2017, 550:18 pages.
Sutton et al., "Policy Gradient Methods for Reinforcement Learning with Function Approximation," Advances in Neural Information Processing Systems 12, 2000, 7 pages.
van Hasselt et al., "Deep Reinforcement Learning with Double Q-Learning," Proceedings of the Thirtieth AAAI Conference on Artificial Intelligence (AAAI-16), Mar. 2016, 2094-2100.
Vezhnevets et al., "FeUdal Networks for Hierarchical Reinforcement Learning," https://arxiv.org/abs/1703.01161, Mar. 2017, 12 pages.
Wang et al., "Dueling Network Architectures for Deep Reinforcement Learning," https://arxiv.org/abs/1511.06581vl, Nov. 2015, 14 pages.
Wang et al., "Sample Efficient Actor-Critic with Experience Replay," https://arxiv.org/abs/1611.01224v2, last revised Jul. 2017, 20 pages.
Watkins et al., "Q-Learning," Machine Learning, May 1992, 8:279-292.
Wiering, "Explorations in Efficient Reinforcement Learning," PhD Thesis, University of Amsterdam, Feb. 1999, 218 pages.
Zhao et al., "Deep Reinforcement Learning with Experience Replay Based on SARSA," 2016 IEEE Symposium Series on Computational Intelligence (SSCI), Dec. 2016, 6 pages.

* cited by examiner

TRAINING ACTION SELECTION NEURAL NETWORKS USING LEAVE-ONE-OUT-UPDATES

CROSS-REFERENCE TO RELATED APPLICATION

This application is a National Stage Application under 35 U.S.C. § 371 and claims the benefit of International Application No. PCT/EP2018/065409, filed Jun. 11, 2018, which claims priority to U.S. Application No. 62/578,387, filed Oct. 27, 2017 and U.S. Application No. 62/517,826, filed Jun. 9, 2017. The disclosure of the foregoing application is hereby incorporated by reference in its entirety.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that selects actions to be performed by an agent interacting with an environment.

One aspect of this disclosure proposes in general terms a reinforcement learning system in which a policy network is iteratively trained using trajectories (i.e. each trajectory is, for each of a sequence of times, a previously collected corresponding training observation, a training action and a training reward). Each update to the policy network is based on a specific training action of one of the trajectories corresponding to a specific time in the sequence, and includes a leave-one-out update which is based on all possible actions other than the specific training action, and a selected action update which is calculated based on an updated return estimate of a return that would result from the agent performing the specific training action.

According to a first aspect there is provided a method for training a policy neural network having multiple policy network parameters. The policy neural network is used to select actions to be performed by an agent that interacts with an environment by receiving an observation characterizing a state of the environment and performing an action from a set of actions in response to the received observation. The policy neural network has multiple policy network parameters and is configured to receive an input observation and to process the input observation to generate a score distribution over the actions in the set of actions in accordance with the policy network parameters.

The method includes obtaining a trajectory from a replay memory, the trajectory including multiple training observations that each characterize a respective training state of the environment and, for each training observation: a training action from the set of actions that was performed by the agent in response to receiving the training observation and a training reward received by the agent for performing the training action.

An update to current values of the policy network parameters is determined using the trajectory. For each training observation in the trajectory, determining the update includes processing the training observation using the policy neural network in accordance with the current values of the policy network parameters to determine a current score distribution over the actions in the set of actions. For each action, a gradient of the current score for the action with respect to the policy network parameters is determined. The training observation is processed using a distributional critic neural network to generate a respective distribution over possible Q values for each of the actions in the set of actions. A leave-one-out update to the current values of the policy network parameters is determined from, for each action in the set other than the action that was performed in response to the training observation, the gradient of the current score for the action with respect to the policy network parameters and the distribution over possible Q values for the action. An updated return estimate of a return that would have resulted from the policy neural network being used to select future actions performed by the agent is determined in accordance with the current values of the policy network parameters. A selected action update to the current values of the policy network parameters is determined from the updated return estimate and the gradient of the current score for the performed action with respect to the policy network parameters. A final update for the policy network parameters is determined from the selected action update and the leave-one-out update.

In some implementations, the policy neural network is a recurrent neural network.

In some implementations, the policy neural network is a feedforward neural network.

In some implementations, the leave-one-out update to the current values of the policy network parameters is a sum of respective products of, for each action in the set other than the action that was performed in response to the training observation, the gradient of the current score for the action with respect to the policy network parameters and a measure of central tendency of the distribution over possible Q values for the action.

In some implementations, the selected action update is a product of the updated return estimate and the gradient of the current score for the performed action with respect to the policy network parameters.

In some implementations, determining the selected action update includes determining a difference between the updated return estimate and a measure of central tendency of the distribution over possible Q values for the performed action. A product of the difference and the gradient of the current score for the performed action with respect to the policy network parameters is determined. The selected action update is determined by applying an output of a β function to the product.

In some implementations, determining the selected action update includes adding a product of the measure of central tendency of the distribution over possible Q values for the performed action and the gradient of the current score for the performed action with respect to the policy network parameters after applying the output of the β function to the product.

In some implementations, the β function depends on at least one of: the current score for the performed action, a previous score generated for the performed action by the policy neural network by processing the training observation in accordance with earlier values of the policy network parameters that were current when the training observation was received, or an estimate of the previous score.

In some implementations, the β function is one divided by either the previous score for the performed action or the estimate of the previous score.

In some implementations, the β function is a minimum of (i) a predetermined constant greater than one and (ii) one divided by either the previous score for the performed action or the estimate of the previous score.

In some implementations, the β function depends on the estimate of the previous score, and the method further includes processing the training observation using a previous score estimation neural network. The previous score estimation neural network is configured to process the training observation to generate an output including the estimate of the previous score.

In some implementations, the critic network has multiple critic network parameters, and the method further includes determining an update to current values of the critic network parameters using the trajectory. For each training observation in the trajectory, a target distribution that should be generated by the critic network for the performed action by processing the training observation is determined. An update to the current values of the critic network parameters that moves the distribution generated by the critic network for the performed action towards the target distribution is determined.

In some implementations, determining an update to the current values of the critic network parameters includes determining a gradient of a loss function, where the loss function includes a divergence measure between the target distribution and the distribution generated by the critic network for the performed action.

In some implementations, determining the target distribution includes determining the target distribution from the performed actions for other training observations after the training observation in the trajectory using an off-policy distributional reinforcement learning algorithm with multi-step returns.

In some implementations, determining the updated return estimate includes determining the updated return estimate to be a measure of central tendency of the target distribution.

In some implementations, the critic network and the policy neural network share some parameters.

In some implementations, the critic network is a recurrent neural network.

In some implementations, the critic network is a feedforward neural network.

In some implementations, one or more trajectories in the replay memory have not been assigned a priority. Obtaining a trajectory from the replay memory includes, for each trajectory in the replay memory that has not been assigned a priority, determining a temporary priority for the trajectory using priorities assigned to other trajectories in the replay memory. A trajectory is sampled using a priority or a temporary priority assigned to each trajectory in the replay memory.

In some implementations, determining a temporary priority for a trajectory that has not been assigned a priority includes determining a partition of the trajectories in the replay memory into multiple cells, where each cell includes one reference trajectory that has been assigned a priority. A plurality of reference cells are identified, where one of the reference cells includes the trajectory that has not been assigned a priority. The temporary priority for the trajectory that has not been assigned a priority is determined using the priorities of the reference trajectories included in the reference cells.

In some implementations, identifying the reference cells includes identifying a consecutive sequence of cells of a predetermined length.

In some implementations, determining the temporary priority for the trajectory that has not been assigned a priority includes, for each reference cell, determining a weight for the reference trajectory in the reference cell using a total number of trajectories included in the reference cell. The temporary priority for the trajectory that has not been assigned a priority is determined by a weighted average of the priorities of the reference trajectories in the reference cells using the determined weights.

In some implementations, the method includes determining a priority for the obtained trajectory using a distribution generated by the critic network for the performed action and the target distribution.

According to a second aspect, there is provided a method of training a policy neural network having multiple policy network parameters. The policy neural network is used to select actions to be performed by an agent that interacts with an environment by receiving an observation characterizing a state of the environment and performing an action from a set of actions in response to the received observation. The policy neural network multiple policy network parameters and is configured to receive an input observation and to process the input observation to generate a score distribution over the actions in the set of actions in accordance with the policy network parameters.

The method includes obtaining a trajectory from a replay memory, the trajectory including multiple training observations that each characterize a respective training state of the environment and, for each training observation: a training action from the set of actions that was performed by the agent in response to receiving the training observation and a training reward received by the agent for performing the training action.

An update to current values of the policy network parameters is determined using the trajectory. For each training observation in the trajectory, the training observation is processed using the policy neural network in accordance with the current values of the policy network parameters to determine a current score distribution over the actions in the set of actions. For each action, a gradient of the current score for the action with respect to the policy network parameters is determined. The training observation is processed using a critic neural network to generate a respective Q value for each of the actions in the set of actions. A leave-one-out update to the current values of the policy network parameters is determined from, for each action in the set other than the action that was performed in response to the training observation, the gradient of the current score for the action with respect to the policy network parameters and the Q value for the action. An updated return estimate of a return that would have resulted from the policy neural network being used to select future actions performed by the agent in accordance with the current values of the policy network parameters is determined. A selected action update to the current values of the policy network parameters is determined from the updated return estimate and the gradient of the current score for the performed action with respect to the policy network parameters. A final update for the policy network parameters is determined from the selected action update and the leave-one-out update.

In some implementations, the policy neural network is a recurrent neural network.

In some implementations, the policy neural network is a feedforward neural network.

In some implementations, the leave-one-out update to the current values of the policy network parameters is a sum of respective products of, for each action in the set other than the action that was performed in response to the training observation, the gradient of the current score for the action with respect to the policy network parameters and the Q value for the action.

In some implementations, the selected action update is a product of the updated return estimate and the gradient of the current score for the performed action with respect to the policy network parameters.

In some implementations, determining the selected action update includes determining a difference between the updated return estimate and the Q value for the performed action. A product of the difference and the gradient of the current score for the performed action with respect to the policy network parameters is determined. The selected action update is determined by applying an output of a β function to the product.

In some implementations, determining the selected action update further includes adding a product of the Q value for the performed action and the gradient of the current score for the performed action with respect to the policy network parameters after applying the output of the β function to the product.

In some implementations, the β function depends on at least one of: the current score for the performed action, a previous score generated for the performed action by the policy neural network by processing the training observation in accordance with earlier values of the policy network parameters that were current when the training observation was received, or an estimate of the previous score.

In some implementations, the β function is one divided by either the previous score for the performed action or the estimate of the previous score.

In some implementations, the β function is a minimum of (i) a predetermined constant greater than one and (ii) one divided by either the previous score for the performed action or the estimate of the previous score.

In some implementations, the β function depends on the estimate of the previous score, and the method further includes processing the training observation using a previous score estimation neural network. The previous score estimation neural network is configured to process the training observation to generate an output including the estimate of the previous score.

In some implementations, the critic network has multiple critic network parameters, and the method further includes determining an update to current values of the critic network parameters using the trajectory. For each training observation in the trajectory, a target Q value that should be generated by the critic network for the performed action by processing the training observation is determined. An update to the current values of the critic network parameters that moves the Q value generated by the critic network for the performed action by processing the training observation towards the target Q value is determined.

In some implementations, for each training observation, the updated return estimate is the target Q value that should be generated by the critic network for the performed action by processing the training observation.

In some implementations, determining the target Q value includes determining the target Q value from (i) the training reward for the training observation and training rewards for any training observations after the training observation in the trajectory and (ii) the performed actions for any training observations after the training observation in the trajectory using an off-policy reinforcement learning algorithm with multi-step returns.

In some implementations, the off-policy reinforcement learning algorithm is a Retrace algorithm.

In some implementations, the off-policy reinforcement learning algorithm is a Retrace algorithm that employs a target critic network to determine the target Q value.

In some implementations, the critic network and the policy neural network share some parameters.

In some implementations, the critic network is a recurrent neural network.

In some implementations, the critic network is a feedforward neural network.

According to a third aspect, there is provided a system of one or more computers and one or more storage devices storing instructions that are operable, when executed by the one or more computers, to cause the one or more computers to perform operations according to the previously described methods.

According to a fourth aspect, there is provided a computer-readable storage medium including instructions stored thereon that are executable by a processing device and upon such execution cause the processing device to perform operations according to the previously described methods.

Particular embodiments of the subject matter described in this specification can be implemented so as to realize one or more of the following advantages.

The system described in this specification can train a policy neural network used to select actions to be performed by an agent interacting with an environment more efficiently (e.g., using fewer computational resources, such as memory and computing power) than some conventional systems. Moreover, the system described in this specification can train the policy neural network to select actions that cause the agent to perform tasks more effectively than some conventional systems.

For example, a system described in this specification can train the policy network more effectively (e.g., over fewer training iterations) by sampling trajectories from a replay memory (i.e., to be used in training the policy neural network) in accordance with adaptively determined temporary priorities. More specifically, the system described in this specification can adaptively determine temporary priorities for trajectories in the replay memory without an assigned priority based on priorities previously assigned to other trajectories in the replay memory. For example, in the case that the trajectories in the replay memory are arranged in an array (e.g. a one-dimensional order), the temporary priority for a trajectory without an assigned priority can be determined based on a contiguous region in the replay memory defined based on the position of the trajectory in the memory. In one example, the trajectories may have an order in the replay memory which is the order in which they were generated during a training procedure for the policy network (e.g. if the replay memory is implemented as a FIFO (first-in-first-out) queue in which trajectories can be chosen from any position in the queue), and the temporary priority for a trajectory without an assigned priority can be determined based on a sequence of trajectories selected based on the position of the given trajectory (e.g. including or proximate the given trajectory). In contrast, some conventional systems assign a predetermined (e.g., constant) priority to each new trajectory added to the replay memory. By sampling trajectories from the replay memory in accordance with the adaptively determined temporary priorities, the system described in this specification is more likely to sample trajectories which can be used to train the policy neural network rapidly and effectively (e.g., to achieve an acceptable performance level over fewer training iterations).

As another example, unlike some conventional systems, the system described in this specification can train the policy neural network using distributional reinforcement learning updates based on multi-step returns (i.e., data characterizing rewards received by the agent over multiple time steps). Distributional reinforcement learning refers to a machine learning technique involving training Q neural networks to generate probability distributions over possible Q values for actions rather than a single expected Q value (i.e., as in conventional reinforcement learning). The probability distributions over possible Q values are subsequently used in determining updates to the parameters of the policy neural network. In some cases, training a policy neural network using distributional reinforcement learning techniques results in the agent interacting with the environment more effectively.

Moreover, the system described in this specification can train the policy neural network using off-policy trajectories (unlike some conventional systems). Off-policy trajectories characterize interactions of the agent with the environment over multiple time steps where the agent performed actions which were not selected in accordance with the current values of the policy network parameters. That is, the actions identified in an off-policy trajectory were not selected using the current values of the policy network parameters. By training the policy network using off-policy trajectories, the system described in this specification enables the policy network to achieve an acceptable performance level more rapidly (i.e., over fewer training iterations) than conventional systems which can only train the policy network using on-policy trajectories.

As another example, the system described in this specification determines final updates to the policy network parameters during training using selected action updates that are based on updated return estimates. The updated return estimates are more accurate estimates of the returns that would result from the agent performing actions in response to observations than, for example, Q values generated by a critic network included in the system. By determining the selected action update using the more accurate updated return estimates, the system can train the policy neural network to perform given tasks more effectively than it otherwise would, i.e., because the policy neural network learns to generate outputs that more accurately reflect actual returns.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
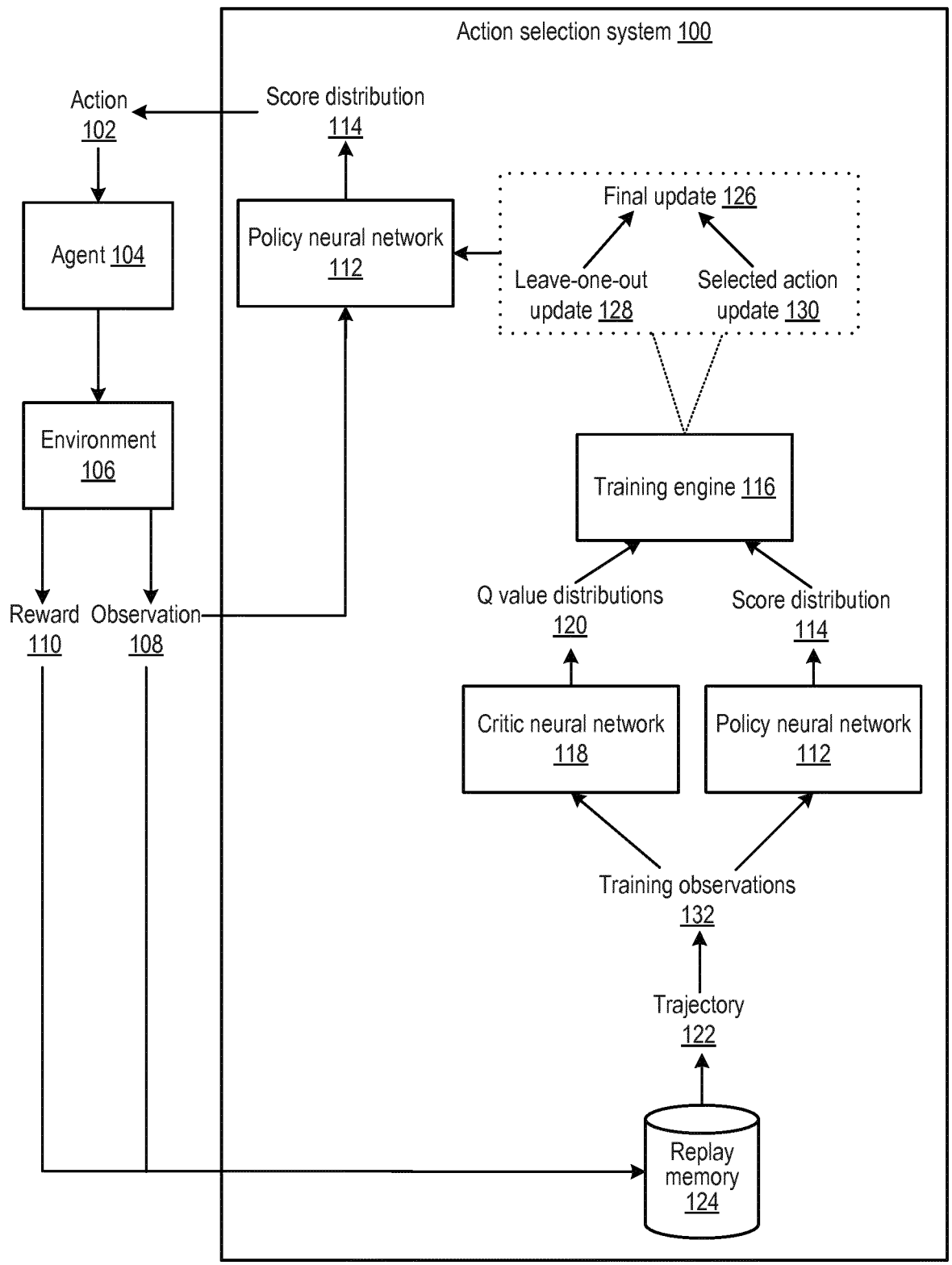
FIG. 1A is a block diagram of an example action selection system.

FIG. 1A shows an example action selection system 100. The action selection system 100 is an example of a system implemented as computer programs on one or more computers in one or more locations in which the systems, components, and techniques described below are implemented.

The action selection system 100 selects actions 102 to be performed by an agent 104 interacting with an environment 106 at each of multiple time steps. At each time step, the system 100 receives data characterizing the current state of the environment 106, e.g., an image of the environment 106, and selects an action 102 to be performed by the agent 104 in response to the received data. Data characterizing a state of the environment 106 will be referred to in this specification as an observation 108. At each time step, the state of the environment 106 at the time step (as characterized by the observation 108) depends on the state of the environment 106 at the previous time step and the action 102 performed by the agent 104 at the previous time step.

The system 100 described herein is widely applicable and is not limited to one specific implementation. However, for illustrative purposes, a small number of example implementations are described below.

In some implementations, the environment 106 is a real-world environment and the agent 104 is a mechanical agent interacting with the real-world environment. For example, the agent 104 may be a robot interacting with the environment 106 to accomplish a specific task. As another example, the agent 104 may be an autonomous or semi-autonomous vehicle navigating through the environment 106. In these implementations, the actions 102 may be control inputs to control the robot or the autonomous vehicle. In some of these implementations, the observations 108 may be generated by or derived from sensors of the agent 104. For example, the observations 108 may be captured by a camera of the agent 104. As another example, the observations 108 may be derived from data captured from a laser sensor of the agent 104. As another example, the observations 108 may be hyperspectral images captured by a hyperspectral sensor of the agent 104.

In some implementations, the environment 106 is an industrial facility and the agent 104 is a control system for the industrial facility. For example, the agent 104 may be a temperature control system controlling the temperature of a data center. In this example, the actions 102 may be control inputs to control the temperature of the data center, such as control inputs governing the rotational speed of the blades of fans that cool the data center or control inputs turning certain cooling machinery on or off.

In some implementations, the environment 106 may be a simulated environment and the agent 104 may be implemented as one or more computer programs interacting with the simulated environment. For example, the simulated environment 106 may be a video game and the agent 104 may be a simulated user playing the video game. As another example, the simulated environment 106 may be a motion simulation environment, e.g., a driving simulation or a flight simulation, and the agent 104 may be a simulated vehicle navigating through the motion simulation environment. In these implementations, the actions 102 may be control inputs to control the simulated user or simulated vehicle.

At each time step, the agent 104 may receive a reward 110 based on the current state of the environment 106 and the action 102 of the agent 104 at the time step. In general, the reward 110 is a numerical value. The reward 110 can be based on any event or aspect of the environment 106. For example, the reward 110 may indicate whether the agent 104 has accomplished a task (e.g., navigating to a target location in the environment 106) or the progress of the agent 104 towards accomplishing a task.

The system 100 uses a policy neural network 112 to select the actions 102 to be performed by the agent 104. More specifically, at each time step, the system 100 provides a network input including the observation 108 at the time step to the policy network 112. The policy network 112 is configured to process the network input in accordance with current values of policy network parameters to generate a score distribution 114 over actions in a set of possible actions that can be performed by the agent 104. The system 100 selects the action 102 to be performed by the agent 104 at the time step based on the score distribution 114.

The score distribution 114 includes a respective numerical score value for each action in a set of possible actions that can be performed by the agent 104. In some implementations, the system 100 processes the score values included in the score distribution 114 by a soft-max function to determine a respective probability value for each action. The system 100 may select the action 102 to be performed by the agent 104 by sampling an action from the set of possible actions in accordance with the probability values for each action. In some implementations, the system 100 selects the action 102 to be performed by the agent 104 as the action with the highest score value.

In order to effectively use the policy network 112 to select actions 102 to be performed by the agent 104, the system 100 includes a training engine 116 which is configured to train the policy network 112 over multiple training iterations using reinforcement learning techniques. The training engine 116 trains the policy network 112 by iteratively (i.e., at each training iteration) adjusting the current values of the policy network parameters. By training the policy network 112, the training engine 116 may cause the policy network 112 to generate score distributions 114 that result in the selection of actions 102 which increase a cumulative measure of reward (e.g., a time-discounted sum of future rewards) received by the agent 104. By increasing a cumulative measure of reward received by the agent 104, the training engine 116 may cause the agent 104 to perform given tasks more effectively.

In some implementations, the training engine 116 trains the policy network 112 continuously (i.e., so that the policy network parameters are constantly being updated as the agent 104 interacts with the environment 106). In some implementations, the training engine 116 trains the policy network 112 to determine trained values of the policy network parameters and then holds the trained values fixed.

In either case, the system 100 can store the values of the policy network parameters as of a given point during the training for later use in instantiating a policy network 112 or can transmit the policy network parameter values to another system for use in instantiating a policy network 112.

To facilitate training the policy network 112, the training engine 116 jointly trains a critic neural network 118 (which may also be referred to as a Q neural network) along with the policy network 112. That is, at each training iteration the training engine 116 adjusts the current values of both the critic network parameters and the policy network parameters. The critic network 118 is configured to process an input including an observation characterizing a state of the environment 106 in accordance with current values of critic network parameters to generate a respective Q value distribution 120 for each action in the set of possible actions. A Q value distribution 120 for an action defines a probability distribution over a set of possible Q values for the action. The Q value for an action is an estimate of a return that would result from the agent 104 performing the action in response to the observation and thereafter using the policy network 112 to select future actions performed by the agent 104 in accordance with the current values of the policy network parameters. A return refers to an estimate of a cumulative measure of reward received by the agent 104, for example, a time-discounted sum of future rewards. Training the critic network 118 is described further with reference to FIG. 4.

At each training iteration, the training engine 116 obtains a trajectory 122 stored in a replay memory 124. The trajectory 122 includes a sequence of multiple training observations 132 that each characterize a respective training state of the environment 106. For each training observation, the trajectory 122 includes a training action (i.e., from the set of possible actions) that was performed by the agent 104 in response to receiving the training observation and a training reward received by the agent for performing the training action. In some implementations, the training engine 116 obtains the trajectory 122 by sampling a trajectory randomly from the replay memory 124. In some implementations, the training engine 116 obtains the trajectory 122 by sampling a trajectory from the replay memory 124 in accordance with priority values associated with the trajectories in the replay memory 124. An example process for obtaining a trajectory 122 from the replay memory 124 by sampling from the replay memory 124 in accordance with priority values associated with the trajectories in the replay memory 124 is described with reference to FIG. 5.

The system 100 may have generated the trajectories stored in the replay memory 124 by selecting actions 102 to be performed by the agent 104 at multiple previous time steps and then storing the resulting trajectories in the replay memory 124. Generally, the replay memory 124 may include "off-policy" trajectories. A trajectory is said to be off-policy if the training actions in the trajectory were not selected in accordance with the current values of the policy network parameters. For example, a trajectory may be off-policy because the training actions in the trajectory were selected in accordance with previous values of policy network parameters that, due to training, are different than the current values of the policy network parameters.

For each training observation 132 in the trajectory 122, the training engine 116 determines a corresponding final update 126 for the policy network parameters. Each final update 126 can be represented in any appropriate numerical format (e.g., as a vector) and includes one or more final update values which the training engine 116 can use to adjust the current values of the policy network parameters. For example, each final update value may correspond to a respective policy network parameter and the final update can include a respective final update value for each of the policy network parameters. The training engine 116 can, for example, adjust the current value of a policy network parameter by adding the product of: (i) a final update value corresponding to the policy network parameter in a final update 126, and (ii) a learning rate parameter, to the current value of the policy network parameter.

To determine the final update 126 corresponding to a training observation 132, the training engine 116 processes the training observation 132 using the critic network 118 and the policy network 112. The critic network 118 processes the training observation 132 in accordance with the current values of critic network parameters to generate a respective Q value distribution 120 for each action in the set of possible actions. The policy network 112 processes the training observation 132 in accordance with the current values of the policy network parameters to generate a score distribution 114 including a respective score value for each action in the set of possible actions.

As will be described further with reference to FIG. 3, the training engine 116 uses the score distribution 114 and the Q value distributions 120 to generate a leave-one-out update 128 and a selected action update 130 (which may also be called a "performed action update"). Thereafter, the training engine 116 determines the final update 126 for the training observation from the leave-one-out update 128 and the selected action update 130. Analogously to the final update 126, both the leave-one-out update 128 and the selected action update 130 can be represented in any appropriate numerical format (e.g., as vectors) and include respective update values which the training engine 116 can use to adjust the current values of the policy network parameters.

The training engine 116 determines the leave-one-out update 128 based on the score values (i.e., from the score distribution 114) and measures of central tendency of the Q value distributions 120 which correspond to actions other than the training action performed in response to the training observation. A measure of central tendency of a distribution may refer to, for example, the mean, median, or mode of the distribution. Generally, the system 100 "leaves out" the score value and the measure of central tendency of the Q value distribution 120 corresponding to the training action in determining the leave-one-out update 128.

To determine the selected action update 130, the training engine 116 determines (based on the trajectory 122) an updated return estimate. The updated return estimate is a more accurate estimate of the return that would result from the agent 104 performing the training action in response to the training observation 132 than, for example, a measure of central tendency of the Q value distribution 120 generated by the critic network 118 for the training action. The training engine 116 determines the selected action update 130 based on the score value (i.e., from the score distribution 114) and the updated return estimate for the training action. By determining the selected action update 130 using the more accurate updated return estimate, the training engine 116 can train the policy network 112 to perform given tasks more effectively than it otherwise would.

The training engine 116 can use the final update 126 corresponding to a training observation 132 to adjust the current values of the policy network parameters. In some cases, the training engine 116 combines the final updates 126 for each training observation 132 in the trajectory 122 and applies the combined final updates to adjust the current values of the policy network parameters. In some cases, the training engine 116 determines and combines final updates 126 from multiple trajectories before applying all of the updates to adjust the current values of the policy network parameters.

In some cases, the critic network 118 is configured to generate a respective expected Q value for each action in the set of possible actions, rather than a Q value distribution 120 (as described earlier). In these cases, the training engine 116 determines the leave-one-out update 128 based on the score values (i.e., from the score distribution 114) and the Q values (i.e., generated by the critic network) which correspond to actions other than the training action performed in response to the training observation. Examples processes for determining final updates 126 and training the critic network 118 in the case where the critic network 118 is configured to generate expected Q values are described below (with reference to FIG. 3 and FIG. 4) alongside the description of these processes in the case where the critic network 118 is configured to generate Q value distributions.

The critic network 118 and the policy network 112 may be implemented as any appropriate deep neural network models. For example, the critic network 118 and the policy network 112 may be implemented as feed-forward neural networks (e.g., multi-layer perceptrons or convolutional neural networks) or recurrent neural networks (e.g., long short-term memory (LSTM) networks). In some cases, the critic network 118 and the policy network 112 may share one or more parameter values. A parameter value is said to be shared between two neural networks if the value of the parameter is the same for both neural networks. In particular, if a parameter value is shared between two neural networks, then changing the parameter value in one network (e.g., during training) to a new value causes the parameter value in the other network to change to the new value as well.

Figure 1B:
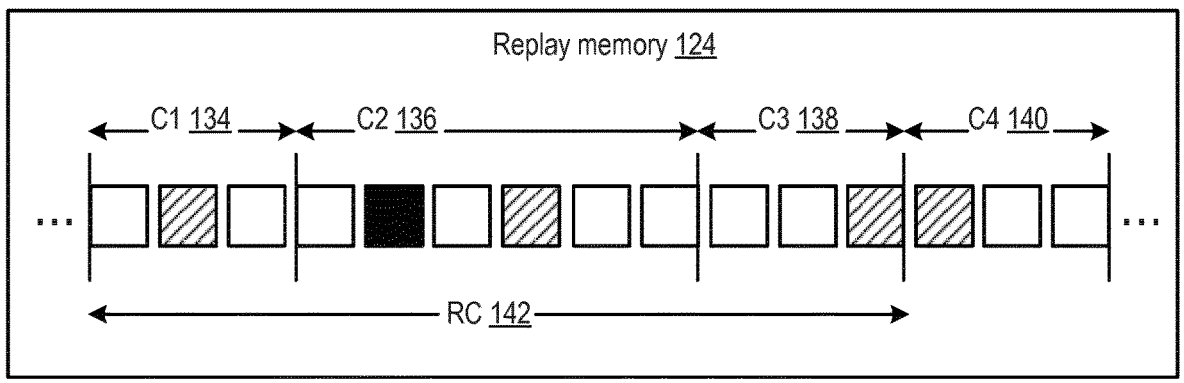
FIG. 1B is a block diagram of an example replay memory.

FIG. 1B is a block diagram of an example replay memory 124. The replay memory 124 includes a sequence of trajectories. As previously described, each trajectory includes a sequence of multiple training observations that each characterize a respective training state of the environment 106. The trajectories in the replay memory 124 may have an associated priority value. A priority of a trajectory reflects a likelihood that the training engine 116 will sample the trajectory from the replay memory 124 during training. However, when the training engine 116 adds a new trajectory to the replay memory 124 (e.g., based on a series of actions 102 recently performed by the agent 104), the training engine 116 does not assign a priority to the new trajectory. Therefore, the replay memory 124 generally includes multiple trajectories without an assigned priority.

In order to sample a trajectory from the replay memory 124 during training, the training engine 116 determines a temporary priority for each trajectory without an assigned priority using the priorities previously assigned to other trajectories in the replay memory 124. Once the training engine 116 has sampled a trajectory from the replay memory 124 using the assigned priorities and the determined temporary priorities, the temporary priorities are discarded. After using the sampled trajectory to train the system 100, the training engine 116 determines a priority for the trajectory and assigns the priority to the trajectory.

As will be described in more detail with reference to FIG. 5, to determine temporary priorities for trajectories without assigned priorities, the training engine 116 determines a partition of the trajectories in the replay memory into multiple cells (e.g., the cells C1 134, C2 136, C3 138, and C4 140) where each cell includes one trajectory that has previously been assigned a priority (referred to herein as a reference trajectory). For a given trajectory that has not been assigned a priority, the training engine 116 identifies a set of multiple reference cells (e.g., the set of reference cells RC 142, consisting of cells C1 134, C2 136, and C3 138) in a local neighborhood of the given trajectory, where one of the reference cells (in this example, C2 136) includes the given trajectory. For example, the training engine 116 may identify the reference cells as any consecutive sequence of cells of a predetermined length, where one of the cells includes the given trajectory. The training engine 116 determines the temporary priority for the given trajectory using the priorities assigned to the reference trajectories in the reference cells for the given trajectory. For example, the training engine 116 may determine the temporary priority for the given trajectory by a weighted average of the priorities of the reference trajectories in the reference cells for the given trajectory (as will be described in more detail later).

In some conventional systems, a predetermined (e.g., constant) priority is assigned to each new trajectory added to the replay memory. In contrast, the training engine 116 adaptively determines respective temporary priorities for trajectories without an assigned priority (e.g., new trajectories or trajectories that have not previously been sampled by the training engine 116) based on priorities previously assigned to reference trajectories in local neighborhoods. Thereby, the training engine 116 may sample trajectories which enable the system 100 to be trained more effectively.

Figure 1B:
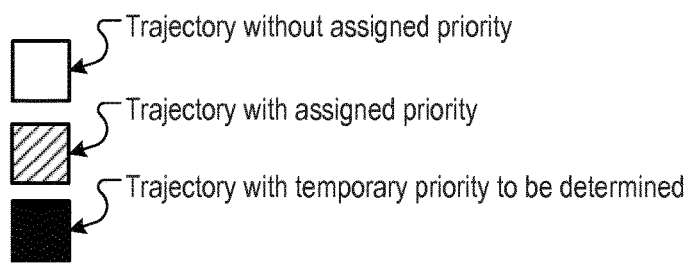
Figure 2:
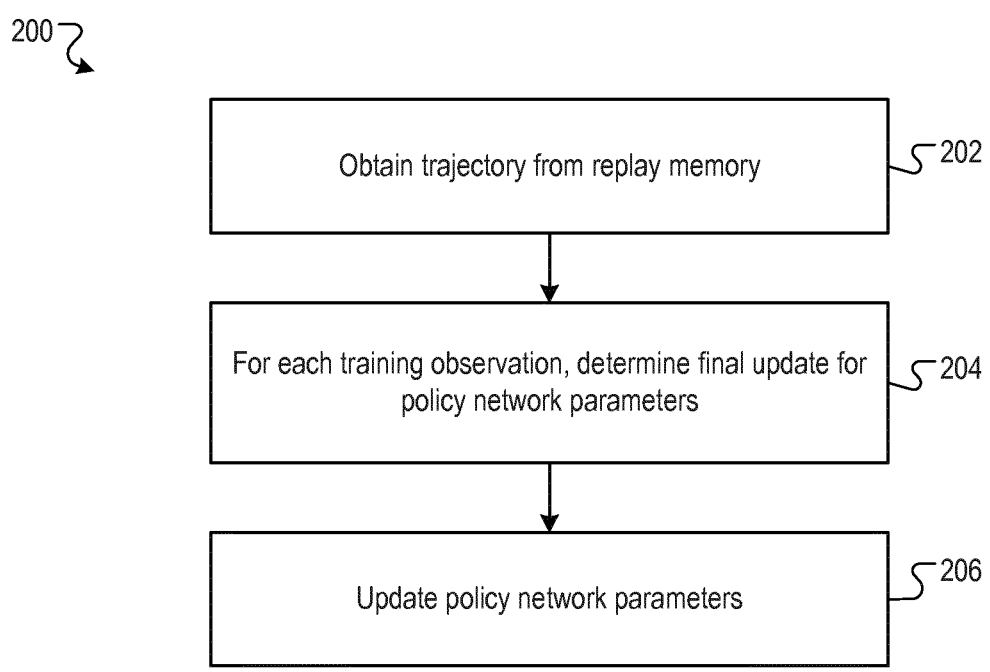
FIG. 2 is a flow diagram of an example process for updating the parameters of a policy neural network using a trajectory of training observations.

FIG. 2 is a flow diagram of an example process for updating the parameters of a policy neural network using a trajectory of training observations. For convenience, the process 200 will be described as being performed by a system of one or more computers located in one or more locations. For example, an action selection system, e.g., the action selection system 100 of FIG. 1, appropriately programmed in accordance with this specification, can perform the process 200.

The system obtains a trajectory stored in the replay memory (202). The trajectory includes a sequence of multiple training observations that each characterize a respective training state of the environment. For each training observation, the trajectory includes a training action from the set of possible actions that was performed by the agent in response to receiving the training observation and a training reward received by the agent for performing the training action. In some implementations, the system obtains the trajectory by randomly sampling from the replay memory. In some implementations, the system obtains the trajectory by sampling from the replay memory in accordance with priority values associated with the trajectories stored in the replay memory (as described with reference to FIG. 5).

For each training observation, the system determines a final update for the policy network parameters (204). Each final update can be represented in any appropriate numerical format (e.g., as a vector) and includes one or more final update values which (as will be described further with reference to 206) the system can use to adjust the current values of the policy network parameters. As will be described further with reference to FIG. 3, to determine the final update for the policy network parameters corresponding to a training observation, the system determines and combines: (i) a leave-one-out update for the policy network parameters and (ii) a selected action update for the policy network parameters.

The system updates the current values of the policy network parameters using the final updates for the policy network parameters corresponding to the training observations (206). For example, for a given final update and a given policy network parameter θ, the system may update the current value of the policy network parameter by:

$$\theta \leftarrow \theta + r \cdot g_\theta \qquad (1)$$

where ← is an assignment operator, r is a positive learning rate hyper-parameter (i.e., a hyper-parameter governing how much the value of the policy network parameter θ can change in a training iteration), and $g_\theta$ is a final update value in the given final update corresponding to the policy network parameter θ.

Figure 3:
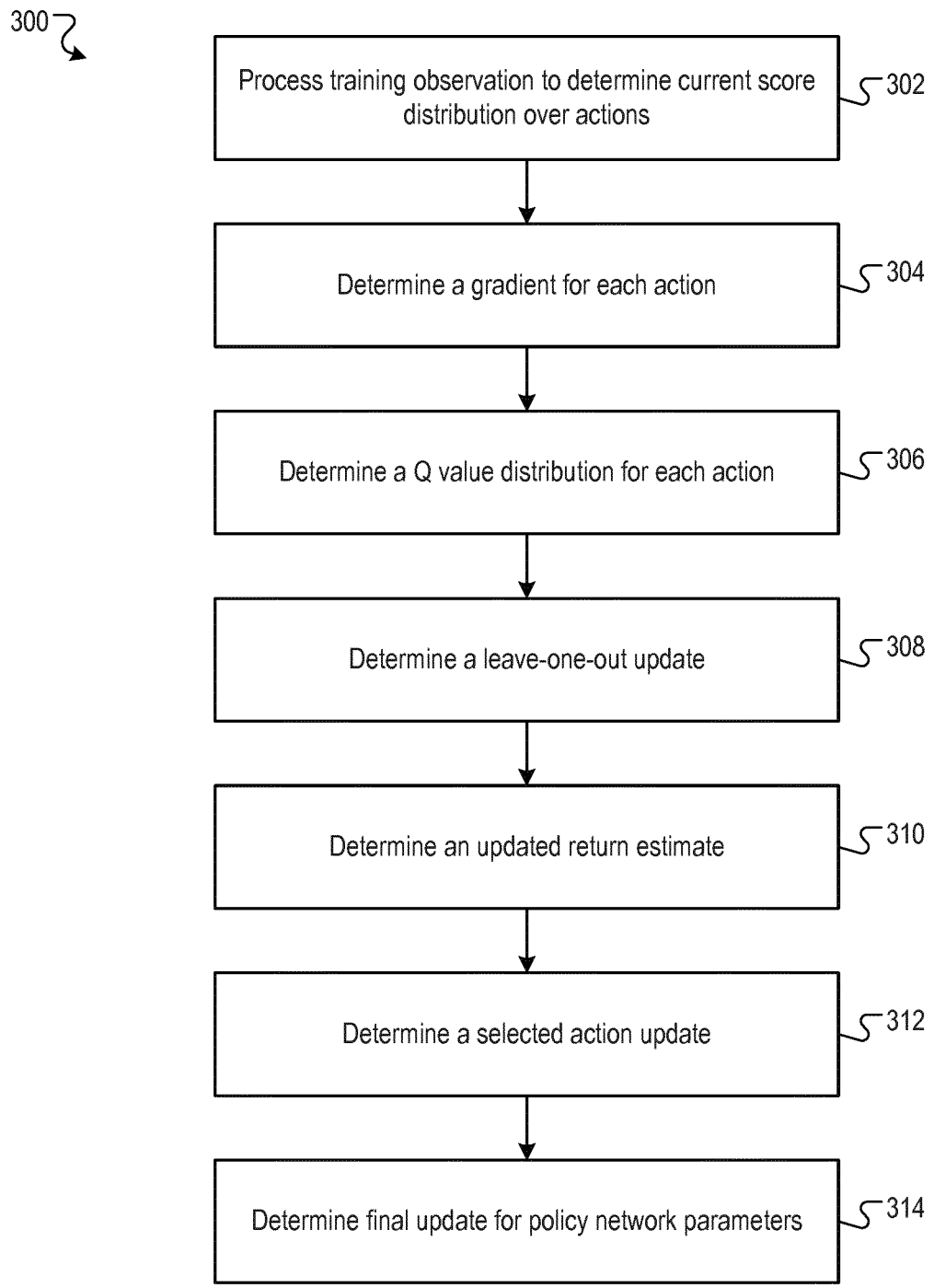
FIG. 3 is a flow diagram of an example process for determining a final update for policy network parameters corresponding to a given training observation.

FIG. 3 is a flow diagram of an example process for determining a final update for policy network parameters corresponding to a given training observation in a trajectory of training observations. Generally, the system performs the steps of the process 300 for each training observation in the trajectory of training observations. For convenience, the process 300 will be described as being performed by a system of one or more computers located in one or more locations. For example, an action selection system, e.g., the action selection system 100 of FIG. 1, appropriately programmed in accordance with this specification, can perform the process 300.

The system processes the training observation using the policy network in accordance with the current values of the policy network parameters to generate a current score distribution (302). The current score distribution includes a respective current score for each action in the set of possible actions that can be performed by the agent. The policy network may be implemented as any appropriate deep neural network model (e.g., as a feed-forward neural network or as a recurrent neural network).

For each action in the set of possible actions that can be performed by the agent, the system determines a gradient of the current score for the action (e.g., as determined in 302) with respect to the policy network parameters (304). The system can determine the gradient by any appropriate method, such as backpropagation, backpropagation-through-time, or truncated backpropagation-through-time. For a given action, the gradient of the current score for the action with respect to the policy network parameters can be represented in any appropriate numerical format, for example, as a vector.

The system processes the training observation using the critic network in accordance with the current values of the critic network parameters to generate a respective Q value distribution for each action in the set of possible actions (306). A Q value distribution for an action defines a probability distribution over a set of possible Q values for the action. A Q value for an action is an estimate of a return that would result from the agent performing the action in response to the training observation and thereafter using the policy network to select future actions performed by the agent in accordance with the current values of the policy network parameters. In some cases, the critic network is configured to generate a respective expected Q value for each action in the set of possible actions, rather than a Q value distribution. The critic network may be implemented as any appropriate deep neural network model (e.g., as a feed-forward neural network or as a recurrent neural network).

The system determines a leave-one-out update for the policy network parameters (308). The leave-one-out update can be represented in any appropriate numerical format (e.g., as a vector) and includes one or more leave-one-out update values. The system determines the leave-one-out update from, for each action other than the training action that was performed in response to the training observation, the gradient of the current score for the action with respect to the policy network parameters (e.g., as determined in 304) and the Q value distribution for the action (e.g., as determined in 306). For example, the system may determine the leave-one-out update $G_{LOO}$ as:

$$G_{LOO} = \sum_{a \neq A} Q(a) \cdot \nabla \pi(a) \quad (2)$$

where the sum is over each action a other than the action A that was performed in response to the training observation, Q(a) is a measure of central tendency of the Q value distribution for action a, and $\nabla \pi(a)$ is the gradient of the current score for the action a with respect to the policy network parameters. The measure of central tendency may be, for example, a mean, a median, or a mode.

In cases, where the critic network is configured to generate a respective expected Q value for each action in the set of possible actions (i.e., rather than a Q value distribution), the system determines the leave-one-out update from, for each action other than the training action that was performed in response to the training observation, the gradient of the current score for the action with respect to the policy network parameters and the expected Q value for the action. For example, the system may determine the leave-one-out update $G_{LOO}$ as in equation (2), except that Q(a) is the expected Q value for action a (i.e., rather than a measure of central tendency of a Q value distribution for the action a).

The system determines an updated return estimate of a return that would have resulted from the policy network being used to select future actions performed by the agent in accordance with the current values of the policy network parameters after the agent performed the training action in response to the training observation (310). Generally, the updated return estimate is a more accurate estimate of the rewards for the future actions than a measure of central tendency of a Q value distribution (or an expected Q value) generated by the critic network from processing the training observation. The system may determine the updated return estimate to be a measure of central tendency (e.g., a mean) of a target Q value distribution that should be generated by the critic network for the training action by processing the training observation. The system may determine the target Q value distribution using an off-policy distributional reinforcement learning algorithm with multi-step returns. An example process for determining a target Q value distribution using an off-policy distributional reinforcement learning algorithm with multi-step returns is described with reference to FIG. 4 (specifically, step 402).

In cases, where the critic network is configured to generate a respective expected Q value for each action in the set of possible actions (i.e., rather than a Q value distribution), the system may determine the updated return estimate to be a target Q value that should be generated by the critic network for the training action by processing the training observation. The system may determine the target Q value using an off-policy reinforcement learning algorithm with multi-step returns.

The system determines the selected action update for the policy network parameters (312). The selected action update can be represented in any appropriate numerical format (e.g., as a vector) and includes one or more selected action update values. The system determines the selected action update from: (i) the updated return estimate (e.g., as determined in 310), and (ii) the gradient of the current score for the training action performed in response to the training observation with respect to the policy network parameters (e.g., as determined in 304).

In some implementations, the system determines the selected action update $G_S$ as:

$$G_S = R(A) \cdot \nabla \pi(A) \quad (3)$$

where R(A) is the updated return estimate and $\nabla \pi(A)$ is the gradient of the current score for the training action A with respect to the policy network parameters.

Alternatively, the system can determine the selected action update using a β function. The β function is a function (mapping) that depends on at least one of: (i) the current score for the training action (e.g., as determined in 302), (ii) a previous score for the training action, or (iii) an estimate of the previous score for the training action. The previous score for the training action refers to a score generated for the training action by the policy network by processing the training observation in accordance with previous values of policy network parameters that were current when the training observation was received. The previous scores for training actions may be stored in the replay memory. The estimate of the previous score for a training action may be generated by processing the training observation using a previous score estimation neural network which is configured to process the training observation to generate an output including the estimate of the previous score. The system can train the previous score estimation network using supervised learning techniques based on the data stored in the replay memory. In some cases, determining the output of the β function based on estimates of the previous scores may enable the system to train the policy network more effectively than using the actual previous scores.

In some implementations, the system determines the selected action update using the β function by: (i) determining a difference between the updated return estimate and a measure of central tendency of the Q value distribution generated by the critic network for the training action, (ii) determining a product of the difference and the gradient of the current score for the training action with respect to the policy network parameters, (iii) applying the output of the β function to the product, and (iv) adding a product of the measure of central tendency of the Q value distribution for the training action and the gradient of the current score for the performed action to the result. For example, the system may determine the selected action update $G_S$ as:

$$G_S = \beta \cdot (R(A) - Q(A)) \cdot \nabla \pi(A) + Q(A) \cdot \nabla \pi(A) \quad (4)$$

where β is the output of the β function, R(A) is the updated return estimate, Q(A) is the measure of central tendency of the Q value distribution generated by the critic network for the training action, and $\nabla \pi(A)$ is the gradient of the current score for the training action with respect to the policy network parameters.

In cases where the critic network is configured to generate expected Q values rather than Q value distributions, the system may determine the selected action update $G_S$ as previously described (e.g., with reference to equation (4)), except using the expected Q value for the training action rather than the measure of central tendency of the Q value distribution for the training action.

By choosing the β function appropriately, the system can determine a selected action update, and thereafter a final update, which causes the policy network to be trained more effectively than it otherwise would be. In some implementations, the β function is determined as:

$$\beta = \frac{1}{\mu(A)} \qquad (5)$$

where $\mu(A)$ is either the previous score for the training action or an estimate of the previous score for the training action (as described previously). In some implementations, the $\beta$ function is determined as:

$$\beta = \min\left(c, \frac{1}{\mu(A)}\right) \qquad (6)$$

where c is a predetermined constant greater than one and, as before, $\mu(A)$ is either the previous score for the training action or an estimate of the previous score for the training action.

The system determines the final update for the policy network parameters from the selected action update for the policy network parameters (e.g., as determined in 312) and the leave-one-out update (e.g., as determined in 308). For example, the system may determine the final update G for the policy network parameters as:

$$G = G_{LOO} + G_S \qquad (7)$$

where $G_{LOO}$ is the leave-one-out update and $G_S$ is the selected action update.

Figure 4:
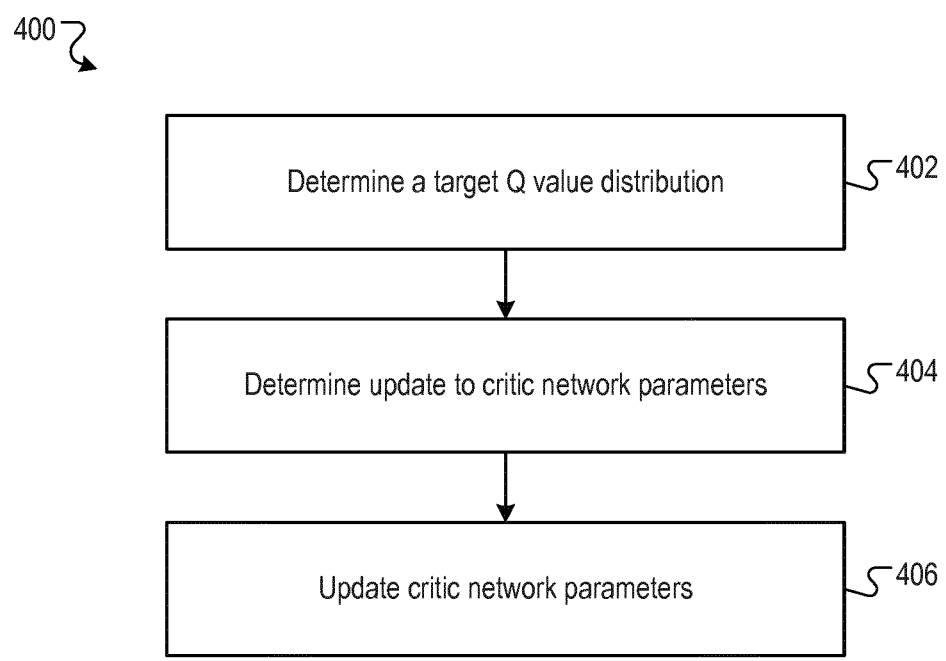
FIG. 4 is a flow diagram of an example process for training a critic neural network using a trajectory of training observations.

FIG. 4 is a flow diagram of an example process for training a critic neural network using a trajectory of training observations. For convenience, the process 400 will be described as being performed by a system of one or more computers located in one or more locations. For example, an action selection system, e.g., the action selection system 100 of FIG. 1, appropriately programmed in accordance with this specification, can perform the process 400. For brevity, the process 400 is described with reference to a given training observation from the trajectory of training observations. Generally, the system can perform the steps of the process 400 for each training observation in the trajectory of training observations.

The system determines a target Q value distribution that should be generated by the critic network for the training action by processing the training observation (402). The system may determine the target Q value distribution using an off-policy distributional reinforcement learning algorithm with multi-step returns. The system may determine the target Q value distribution from: (i) the training observations in the trajectory after the given training observation, (ii) the training actions for the training observations in the trajectory after the given training observation, and (iii) the training reward for the given training observation and for the training observations in the trajectory after the given training observation. For example, the system may determine the target Q value distribution T to be:

$$T = \sum_{i=1}^{I} q_i^*(x_t, a_t) \cdot \delta_{z_i} \qquad (8)$$

where t is an integer value which labels the position of the given training observation in the trajectory (i.e. it is a specific time in a sequence of times for the trajectory), $x_t$ is the given training observation, $a_t$ is the corresponding action of the trajectory, the target Q value distribution T is a discrete distribution with support given by the set of possible Q values $\{z_i\}_{i=1}^{I}$ (where I is a positive integer), $\delta_{z_i}$ is a Dirac delta function located at $z_i$, $q_i^*(x_t, a_t)$ is the target probability associated with Q value $z_i$, and the sum indexes over the set of possible Q values.

The system may determine the target probabilities $\{q_i^*(x_t, a_t)\}_{i=1}^{I}$ as:

$$q_i^*(x_t, a_t) = \sum_{n \geq 1} \sum_a \alpha_{n,a} \sum_j q_j(x_{t+n}, a_{t+n}) h_{z_i}(z_j^n) \qquad (9)$$

where the sum over n indexes over the training observations in the trajectory after the given training observation, the sum over a indexes over the actions in the set of possible actions, $\{\alpha_{n,a}\}$ are scalar coefficients, the sum over j indexes over the possible Q values, $q_j(x_{t+n}, a_{t+n})$ is the probability for possible Q value $z_j$ generated using the critic network for the training action $a_{t+n}$ at time t+n, and $h_{z_i}(.)$ are linear interpolation kernels. Generally, the linear interpolation kernel $h_{z_i}(.)$ characterizes a similarity between its argument and the point $z_i$. For example, the linear interpolation kernel $h_{z_i}(.)$ may be given by:

$$h_{z_i}(x) = \begin{cases} \frac{x - z_{i-1}}{z_i - z_{i-1}}, & \text{if } z_{i-1} \leq x \leq z_i \\ \frac{z_{i+1} - x}{z_{i+1} - z_i}, & \text{if } z_i \leq x \leq z_{i+1} \\ 0, & \text{if } x \leq z_{i-1} \text{ or } x \geq z_{i+1} \\ 1, & \text{if}(x \leq v_{min} \text{ and } z_i = v_{min}) \text{ or } (x \geq v_{max} \text{ and } z_i = v_{max}) \end{cases} \qquad (10)$$

where $\{z_i\}_{i=1}^{I} \in [v_{min}, v_{max}]$. The values $\{z_j^n\}$ may be determined as:

$$z_j^n = \sum_{s=t}^{t+n-1} \gamma^{s-t} r_s + \gamma^n z_j \qquad (11)$$

where $\gamma$ is a discount factor (typically between 0 and 1) and $r_s$ is the training reward at time s.

The coefficients $\{\alpha_{n,a}\}$ may be determined from "traces" $\{c_s\}$ that are based on the current score for the training actions and the previous scores for the training actions (as described previously). For example, the system may determine $\alpha_{n,a}$ as:

$$\alpha_{n,a} = (c_{t+1} \cdots c_{t+n-1})(\pi(a|x_{t+n}) - \mathbb{1}\{a = a_{t+n}\} \cdot c_{t+n}) \qquad (12)$$

where $\pi(a|x_{t+n})$ is the score for the action a from a score distribution generated using the policy neural network by processing the training observation $x_{t+n}$, $\mathbb{1}$ is an indicator function (e.g., that has value 1 when its argument is true and 0 otherwise), and the trace $c_S$ may be given by:

$$c_s = \lambda \min\left(1, \frac{\pi(a_s | x_s)}{\mu(a_s | x_s)}\right) \qquad (13)$$

In cases where the critic network is configured to generate an expected Q value for each action (i.e., rather than a Q value distribution), the system may determine a target Q value that should be generated by the critic network for the training action by processing the training observation. The system may determine the target Q value using an off-policy reinforcement learning algorithm with multi-step returns, for example, the Retrace target Q value described with reference to: "Safe and Efficient Off-Policy Reinforcement Learning", R. Munos et al., 2016, arXiv:1606.02647. The system may determine the target Q value from: (i) the training reward for the given training observation and training rewards for training observations after the given training observation in the trajectory, and (ii) the training actions for training observations after the given training observation in the trajectory.

In some cases, the system maintains a copy of the critic network, referred to as the target critic neural network, which has the same architecture as the critic network but may have different parameter values. The system can periodically update the target critic network parameters to be the same as the critic network parameters. As part of determining the target Q value, the system may process one or more of the training observations in the trajectory using the target critic network instead of the critic network as described above. By incorporating a target critic network, the system can generate updates to the critic network parameters that are more stable than they otherwise would be.

The system determines an update to the current values of the critic network parameters (404). The update may move the Q value distribution generated by the critic network for the training action by processing the training observation towards the target Q value distribution (e.g., as determined in 402). For example, the update to the current values of the critic network parameters may be a gradient with respect to the critic network parameters of a loss function that includes a divergence measure between the target distribution and the distribution generated by the critic network for the training action. In a particular example, the divergence measure may be a Kullback-Leibler divergence measure. The system may determine the gradient by a backpropagation technique.

In cases where the critic network is configured to generate an expected Q value for each action (i.e., rather than a Q value distribution), the update may move the Q value generated by the critic network for the training action by processing the training observation towards the target Q value (e.g., as determined in 402). For example, the update to the current values of the critic network parameters may be a gradient with respect to the critic network parameters of a loss function that measures a difference (e.g., a squared error) between: (i) the target Q value, and (ii) the Q value generated by the critic network for the training action by processing the training observation.

The system updates the current values of the critic network parameters (406). For example, if the update to the critic network parameters is a gradient of a loss function (as described in 404), then the system may update the value of critic network parameter α by:

$$\alpha \leftarrow \alpha + r \cdot \nabla_\alpha \mathcal{L} \qquad (14)$$

where r is a learning rate hyper-parameter and $\nabla_\alpha \mathcal{L}$ is the gradient of the loss function $\mathcal{L}$ with respect to the critic network parameter α.

Figure 5:
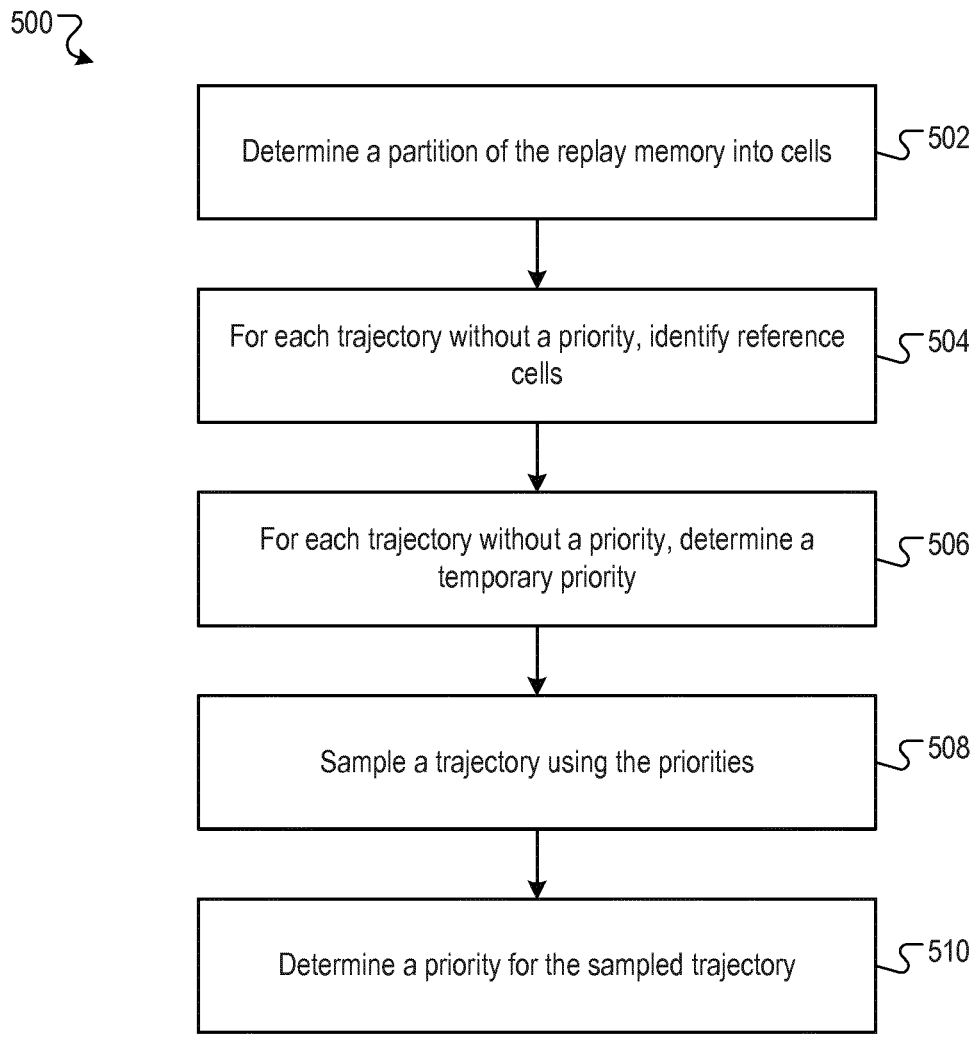
FIG. 5 is a flow diagram of an example process for obtaining a trajectory from a replay memory.

FIG. 5 is a flow diagram of an example process for sampling a trajectory from a replay memory. For convenience, the process 500 will be described as being performed by a system of one or more computers located in one or more locations. For example, an action selection system, e.g., the action selection system 100 of FIG. 1, appropriately programmed in accordance with this specification, can perform the process 500.

The system determines a partition of the sequence of trajectories in the replay memory into multiple cells (502). Each cell includes one reference trajectory (i.e., trajectory that has previously been assigned a priority). Generally, a priority for a trajectory is a numerical value that indicates a likelihood that the training engine will sample the trajectory from the replay memory during training.

For each trajectory that has not been assigned a priority, the system identifies a corresponding set of multiple reference cells (504). For a given trajectory that has not been assigned a priority, the system identifies the corresponding reference cells to be cells in a local neighborhood of the given trajectory, where one of the reference cells includes the given trajectory. For example, the system may identify the reference cells as any consecutive sequence of cells of a predetermined length, where one of the cells includes the given trajectory.

For each trajectory that has not been assigned a priority, the system determines a temporary priority (506). For example, for a given trajectory that has not been assigned a priority, the system may determine a temporary priority for the given trajectory by a weighted average of the priorities of the reference trajectories in the corresponding reference cells for the given trajectory. For example, for a given reference trajectory in a given reference cell corresponding to the given trajectory, the system may determine a weight for the given reference trajectory using the total number of trajectories included in the given reference cell. For example, the training engine may determine the weight $w_n$ for the reference trajectory in reference cell $C_{ii}$ by:

$$w_n = \frac{|C_n|}{\sum_{s=1}^{N} |C_s|} \qquad (15)$$

where N is the total number of reference cells corresponding to the given trajectory and $|C_n|$ is the total number of trajectories included in reference cell $C_n$. The training engine may determine the temporary priority $\hat{p}$ for the given trajectory as:

$$\hat{p} = \sum_{n=1}^{N} w_n \cdot p_n \qquad (16)$$

where $w_n$ is the weight for reference cell $C_n$ and $p_n$ is the priority assigned to the reference trajectory in reference cell $C_n$. By determining the weights for the reference trajectories as described with reference to equation (15), the system compensates for sampling bias effects, where more trajectories are sampled in areas (i.e., in the replay memory) where trajectories are assigned high priorities, thereby potentially resulting in the overestimation of the temporary priorities for trajectories in these areas.

The system samples a trajectory from the replay memory using the priorities and the temporary priorities (508). For example, the system may process the priorities and the temporary priorities using a softmax function to determine a probability distribution over the trajectories in the replay memory, and sample a trajectory in accordance with the probability distribution. In some cases, with a predetermined probability E, the system randomly samples a trajectory from the replay memory (i.e. with equal probabilities for all the trajectories in the replay memory) rather than sampling a trajectory using the priorities and temporary priorities.

After sampling the trajectory from the replay memory, the system typically uses the trajectory to train the system parameters, as described with reference to FIG. 2.

The system determines a priority for the sampled trajectory (510). For example, the system may determine the priority for the sampled trajectory as a sum over each possible Q value of a difference between: (i) a probability for the possible Q value according to a Q value distribution generated by the critic network for a training action by processing a corresponding training observation in the trajectory, and (ii) a probability for the possible Q value according to a target Q value distribution for the training action. The target Q value distribution for a training action is Q value distribution that should be generated by the critic network for the training action by processing the training observation (e.g. as described with reference to 402). For example, the system may determine the priority p for the sampled trajectory as:

$$p = \sum_{i=1}^{I} |q_i(x_t, a_t) - q_i^*(x_t, a_t)| \quad (17)$$

where the sum indexes over the set of possible Q values $q_i(x_t,a_t)$ is the probability for the possible Q value $z_i$ generated by the critic network for the training action $a_t$ by processing the corresponding training observation $x_t$ in the trajectory, and $q^*_i(x_t,a_t)$ is the probability for the possible Q value $z_i$ according to the target Q value distribution for the training action $a_t$.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method of training a policy neural network having a plurality of policy network parameters,
   wherein the policy neural network is used to select actions to be performed by an agent that interacts with an environment by receiving an observation characterizing a state of the environment and performing an action from a set of actions in response to the received observation,
   wherein the policy neural network has a plurality of policy network parameters and is configured to receive an input observation and to process the input observation to generate a score distribution over the actions in the set of actions in accordance with the policy network parameters, and
   wherein the method comprises:
      obtaining a trajectory from a replay memory, the trajectory comprising a plurality of training observations that each characterize a respective training state of the environment and, for each training observation: a training action from the set of actions that was performed by the agent in response to receiving the training observation and a training reward received by the agent for performing the training action; and determining an update to current values of the policy network parameters using the trajectory, comprising:
for each training observation in the trajectory:
processing the training observation using the policy neural network in accordance with the current values of the policy network parameters to determine a current score distribution over the actions in the set of actions;
determining, for each action, a gradient of the current score for the action with respect to the policy network parameters;
processing the training observation using a critic neural network to generate an output for each of the actions in the set of actions;
determining a leave-one-out update to the current values of the policy network parameters from, for each action in the set other than the action that was performed in response to the training observation, the gradient of the current score for the action with respect to the policy network parameters and the generated output of the critic neural network for the action;
determining an updated return estimate of a return that would have resulted from the policy neural network being used to select future actions performed by the agent in accordance with the current values of the policy network parameters;
determining a selected action update to the current values of the policy network parameters from the updated return estimate and the gradient of the current score for the performed action with respect to the policy network parameters; and
determining a final update for the policy network parameters from the selected action update and the leave-one-out update.

2. The method of claim 1, in which the critic neural network is a distributional critic neural network and the generated output of the critic network for each of the actions in the set of actions is a respective distribution over possible Q values.

3. The method of claim 2, wherein the leave-one-out update to the current values of the policy network parameters is a sum of respective products of, for each action in the set other than the action that was performed in response to the training observation, the gradient of the current score for the action with respect to the policy network parameters and a measure of central tendency of the distribution over possible Q values for the action.

4. The method of claim 2, wherein the selected action update is a product of the updated return estimate and the gradient of the current score for the performed action with respect to the policy network parameters.

5. The method of claim 2, wherein determining the selected action update comprises:
determining a difference between the updated return estimate and a measure of central tendency of the distribution over possible Q values for the performed action;
determining a product of the difference and the gradient of the current score for the performed action with respect to the policy network parameters; and
determining the selected action update by applying an output of $\beta$ function to the product.

6. The method of claim 5, wherein determining the selected action update further comprises:
adding a product of the measure of central tendency of the distribution over possible Q values for the performed action and the gradient of the current score for the performed action with respect to the policy network parameters after applying the output of the $\beta$ function to the product.

7. The method of claim 5, wherein the $\beta$ function depends on at least one of: the current score for the performed action, a previous score generated for the performed action by the policy neural network by processing the training observation in accordance with earlier values of the policy network parameters that were current when the training observation was received, or an estimate of the previous score.

8. The method of claim 7, wherein the $\beta$ function is one divided by either the previous score for the performed action or the estimate of the previous score.

9. The method of claim 7, wherein the $\beta$ function is a minimum of (i) a predetermined constant greater than one and (ii) one divided by either the previous score for the performed action or the estimate of the previous score.

10. The method of claim 7, wherein the $\beta$ function depends on the estimate of the previous score, and wherein the method further comprises:
processing the training observation using a previous score estimation neural network, wherein the previous score estimation neural network is configured to process the training observation to generate an output comprising the estimate of the previous score.

11. The method of claim 2, wherein the critic network has a plurality of critic network parameters, wherein the method further comprises determining an update to current values of the critic network parameters using the trajectory, by, for each training observation in the trajectory:
determining a target distribution that should be generated by the critic network for the performed action by processing the training observation; and
determining an update to the current values of the critic network parameters that moves the distribution generated by the critic network for the performed action towards the target distribution.

12. The method of claim 11, wherein determining an update to the current values of the critic network parameters comprises:
determining a gradient of a loss function, wherein the loss function comprises a divergence measure between the target distribution and the distribution generated by the critic network for the performed action.

13. The method of claim 11, wherein determining the target distribution comprises determining the target distribution from the performed actions for other training observations after the training observation in the trajectory using an off-policy distributional reinforcement learning algorithm with multi-step returns.

14. The method of claim 11, wherein determining the updated return estimate comprises determining the updated return estimate to be a measure of central tendency of the target distribution.

15. The method of claim 1, in which the generated output of the critic network for each of the actions in the set of actions is a respective Q value.

16. The method of claim 15, wherein the leave-one-out update to the current values of the policy network parameters is a sum of respective products of, for each action in the set other than the action that was performed in response to the training observation, the gradient of the current score for the action with respect to the policy network parameters and the Q value for the action.

17. The method of claim 15, wherein the selected action update is a product of the updated return estimate and the gradient of the current score for the performed action with respect to the policy network parameters.

18. The method of claim 15, wherein determining the selected action update comprises:
determining a difference between the updated return estimate and the Q value for the performed action;
determining a product of the difference and the gradient of the current score for the performed action with respect to the policy network parameters; and
determining the selected action update by applying an output of a β function to the product.

19. A system comprising one or more computers and one or more storage devices storing instructions that are operable, when executed by the one or more computers, to cause the one or more computers to perform operations for training a policy neural network having a plurality of policy network parameters,
wherein the policy neural network is used to select actions to be performed by an agent that interacts with an environment by receiving an observation characterizing a state of the environment and performing an action from a set of actions in response to the received observation,
wherein the policy neural network has a plurality of policy network parameters and is configured to receive an input observation and to process the input observation to generate a score distribution over the actions in the set of actions in accordance with the policy network parameters, and
wherein the method comprises:
obtaining a trajectory from a replay memory, the trajectory comprising a plurality of training observations that each characterize a respective training state of the environment and, for each training observation: a training action from the set of actions that was performed by the agent in response to receiving the training observation and a training reward received by the agent for performing the training action; and
determining an update to current values of the policy network parameters using the trajectory, comprising:
for each training observation in the trajectory:
processing the training observation using the policy neural network in accordance with the current values of the policy network parameters to determine a current score distribution over the actions in the set of actions;
determining, for each action, a gradient of the current score for the action with respect to the policy network parameters;
processing the training observation using a critic neural network to generate an output for each of the actions in the set of actions;
determining a leave-one-out update to the current values of the policy network parameters from, for each action in the set other than the action that was performed in response to the training observation, the gradient of the current score for the action with respect to the policy network parameters and the generated output of the critic neural network for the action;
determining an updated return estimate of a return that would have resulted from the policy neural network being used to select future actions performed by the agent in accordance with the current values of the policy network parameters;
determining a selected action update to the current values of the policy network parameters from the updated return estimate and the gradient of the current score for the performed action with respect to the policy network parameters; and
determining a final update for the policy network parameters from the selected action update and the leave-one-out update.

20. A non-transitory computer-readable storage medium comprising instructions stored thereon that are executable by a processing device and upon such execution cause the processing device to perform operations for training a policy neural network having a plurality of policy network parameters,
wherein the policy neural network is used to select actions to be performed by an agent that interacts with an environment by receiving an observation characterizing a state of the environment and performing an action from a set of actions in response to the received observation,
wherein the policy neural network has a plurality of policy network parameters and is configured to receive an input observation and to process the input observation to generate a score distribution over the actions in the set of actions in accordance with the policy network parameters, and
wherein the method comprises:
obtaining a trajectory from a replay memory, the trajectory comprising a plurality of training observations that each characterize a respective training state of the environment and, for each training observation: a training action from the set of actions that was performed by the agent in response to receiving the training observation and a training reward received by the agent for performing the training action; and
determining an update to current values of the policy network parameters using the trajectory, comprising:
for each training observation in the trajectory:
processing the training observation using the policy neural network in accordance with the current values of the policy network parameters to determine a current score distribution over the actions in the set of actions;
determining, for each action, a gradient of the current score for the action with respect to the policy network parameters;
processing the training observation using a critic neural network to generate an output for each of the actions in the set of actions;
determining a leave-one-out update to the current values of the policy network parameters from, for each action in the set other than the action that was performed in response to the training observation, the gradient of the current score for the action with respect to the policy network parameters and the generated output of the critic neural network for the action;
determining an updated return estimate of a return that would have resulted from the policy neural network being used to select future actions performed by the agent in accordance with the current values of the policy network parameters;
determining a selected action update to the current values of the policy network parameters from the updated return estimate and the gradient of the current score for the performed action with respect to the policy network parameters; and determining a final update for the policy network parameters from the selected action update and the leave-one-out update.

\* \* \* \* \*